(12) United States Patent
Kimura

(10) Patent No.: US 8,702,072 B2
(45) Date of Patent: Apr. 22, 2014

(54) OVERHEAD WIRE TENSION BALANCER AND WATERPROOF COVER FOR OVERHEAD WIRE TENSION BALANCER

(75) Inventor: Toru Kimura, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 722 days.

(21) Appl. No.: 12/811,887

(22) PCT Filed: May 28, 2009

(86) PCT No.: PCT/JP2009/059812
§ 371 (c)(1),
(2), (4) Date: Jul. 14, 2010

(87) PCT Pub. No.: WO2009/150944
PCT Pub. Date: Dec. 17, 2009

(65) Prior Publication Data
US 2011/0089618 A1    Apr. 21, 2011

(30) Foreign Application Priority Data
Jun. 10, 2008    (JP) .................................. 2008-151747

(51) Int. Cl.
*F16F 9/00* (2006.01)
(52) U.S. Cl.
USPC ..................... 267/73; 267/64.26; 188/322.12; 174/40 TD
(58) Field of Classification Search
USPC ............... 267/73, 64.26; 174/40 TD; 285/13; 188/322.12; 254/228
See application file for complete search history.

(56) References Cited

U.S. PATENT DOCUMENTS

| 3,661,463 | A | * | 5/1972 | Brainard et al. | ............... 356/500 |
| 4,372,429 | A | * | 2/1983 | Marx | ........................ 188/322.12 |
| 4,457,497 | A | * | 7/1984 | Ojima | ............................ 267/134 |
| 2009/0270188 | A1 | | 10/2009 | Yamada et al. | |
| 2010/0289196 | A1 | * | 11/2010 | Kimura | ........................... 267/73 |
| 2011/0253443 | A1 | * | 10/2011 | Sasa | ........................... 174/40 TD |

FOREIGN PATENT DOCUMENTS

| CN | 2531011 Y | | 1/2003 |
| CN | 1902409 A | | 1/2007 |
| JP | 09207629 A | * | 8/1997 |
| JP | A-10-322047 | | 12/1998 |
| JP | A-11-48834 | | 2/1999 |
| JP | A-2001-195936 | | 7/2001 |
| JP | A-2006-226086 | | 8/2006 |
| JP | A-2008-114850 | | 5/2008 |

OTHER PUBLICATIONS

International Search Report issued in corresponding International Patent Application No. PCT/JP2009/059812 mailed on Aug. 11, 2009 (with translation).
Korean Office Action issued in Application No. 10-2010-7014351; Dated Jul. 18, 2011 (With Partial Translation).

* cited by examiner

*Primary Examiner* — Thomas J Williams
*Assistant Examiner* — Mariano Sy
(74) *Attorney, Agent, or Firm* — Oliff & Berridge, PLC

(57) ABSTRACT

An overhead wire tension balancer can prevent an oil component in the tension balancer from scattering to the outside due to entry of rainwater. In an overhead wire tension balancer for supporting a spanned overhead wire while applying tension thereto, a gap that easily allows entry of rainwater is covered by a waterproof cover. As a result, the rainwater can be prevented from entering the inside of the overhead wire tension balancer, and the oil component separated from grease by entering rainwater can be prevented from scattering to the outside.

3 Claims, 9 Drawing Sheets

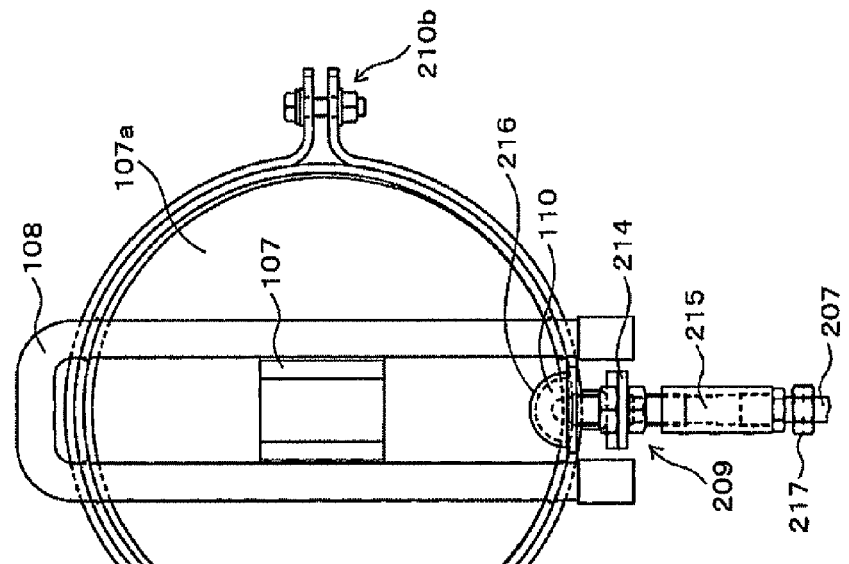
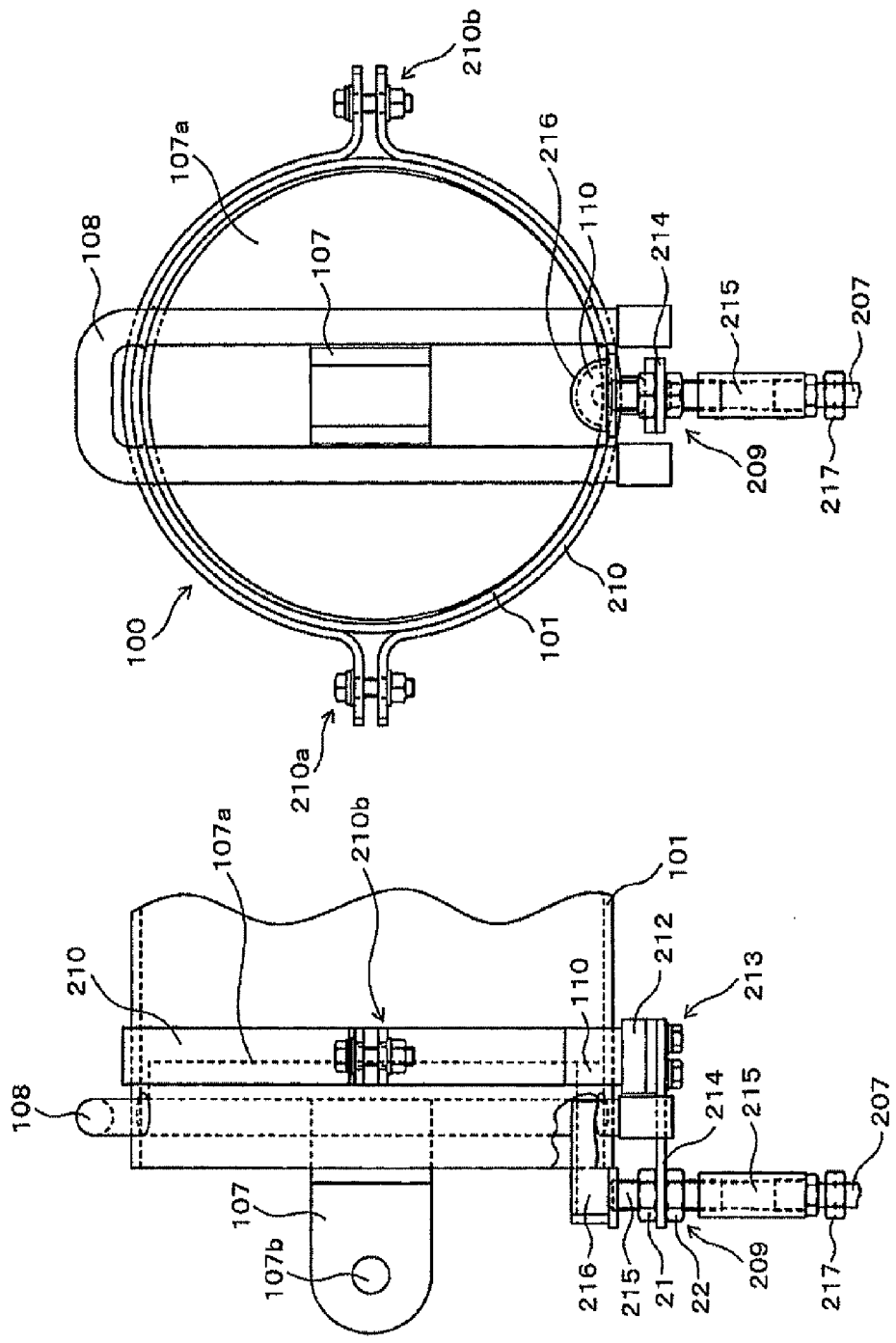

OVERHEAD WIRE TENSION BALANCER AND WATERPROOF COVER FOR OVERHEAD WIRE TENSION BALANCER

BACKGROUND OF THE INVENTION

1. Technical Field

The present invention relates to a waterproof structure for an overhead wire tension balancer and to a technique in which the structure can be used.

2. Background Art

As a device for applying appropriate tension to an overhead wire of railroad, an overhead wire tension balancer having a coil spring has been disclosed (See reference 1). The overhead wire tension balancer has a structure in which plural cylinders are coaxially arranged, and tension is generated because of elasticity of the spring in the case in which the inner cylinder is pulled out of the outer cylinder. Therefore, it must have a structure in which the outer cylinder and the inner cylinder are relatively movable. Since there may be a case in which rainwater enters into the gap between the outer cylinder and the inner cylinder, it has a water draining structure such as a water drainage hole, gap or the like.

In the overhead wire tension balancer, a coil spring is contained so as to apply tension to the overhead wire. Since the spring is in frictional contact with the inner surface of the cylinder or the outer surface of the inner cylinder during above-mentioned movement of the cylinders, a grease as a lubricating agent is applied on a contacting portion of the coil spring and the cylinder.

The reference mentioned above is Japanese Unexamined Patent Application Publication No. Heisei 11 (1999)-48834.

DISCLOSURE OF THE INVENTION

In an overhead wire tension balancer having the above-mentioned structure, there may be a problem in that the oil component of the grease may be scattered from the water drainage hole to the outside and in that it may contaminate a pillar supporting the tension balancer or surface of a rail. As a result of the present inventors' research of this phenomenon, the following has been determined. First, although the grease itself has high viscosity, there is a tendency for the oil component to become separated and become a fluid component over time. This tendency is significant in the case in which rainwater coming from the outside contacts the grease. In addition, the overhead wire tension balancer is sometimes arranged so as to be inclined in an axial direction, and depending on the situation of the arrangement, there may be a case in which the inclination of the arrangement aids the entry of rainwater and scattering in specific directions.

In view of these circumstances, an object of the present invention is to prevent scattering of the oil component from an inner lubricating agent to the outside by rainwater entering into the inside of the tension balancer.

A first aspect of the invention is an overhead wire tension balancer comprising cylindrical members arranged coaxially, a coil spring applying elastic force against relative extension of the cylindrical members in an axial direction, a lubricating agent coated on the coil spring, and a waterproof cover that covers at least part of a gap between the cylindrical members.

According to the first aspect of the invention, since the gap between the cylindrical members is covered with the waterproof cover, rainwater can be prevented from entering into the gap. In the invention described in the first aspect, the number of the cylindrical members is not limited in particular, and the number can be two or more. The number of the coil springs is also not limited in particular. The lubricating agent is a coating agent which is applied or filled at a sliding part of the coil spring and the cylindrical member and which has lubrication property. For example, a grease that is commercially available for lubrication can be used.

A second aspect of the invention is characterized in that the cylindrical members include a first cylindrical member located the furthest to the outside and is fixed to a supporting pillar or a building, and a second cylindrical member located the furthest to the inside and fixes the overhead wire, and the waterproof cover is fixed to the second cylindrical member and is slidably contacted with the outer circumference of the first cylindrical member, in the first aspect of the invention.

According to the second aspect of the invention, the waterproof cover is supported by a fixing portion of the second cylindrical member and a slidably contacting portion of the first cylindrical member. The structure for supporting the waterproof cover is held, even if the second cylindrical member is displaced relative to the first cylindrical member fixed to the supporting pillar, etc., by pulling the overhead wire and the waterproof cover is also displaced together with the second cylindrical member relative to the first cylindrical member. As a result, in spite of the displacement of the second cylindrical member, the waterproof cover can be stably held at a main body of the overhead wire tension balancer and high reliability can be obtained. Here, between the first cylindrical member and the second cylindrical member, one or more other cylindrical members may be arranged, or no other cylindrical member may be arranged. The cross sectional shape of the cylindrical member may be a circle or may be a polygon.

A third aspect of the invention is characterized in that the waterproof cover comprises a scaling member having a scale that measures a displacement dimension of relative extension in an axial direction between the cylindrical members, in the second aspect of the invention. According to the third aspect of the invention, when the second cylindrical member is displaced relative to the first cylindrical member, the waterproof cover is also displaced together with the second cylindrical member. In this case, the scaling member is displaced with the waterproof cover relative to the first cylindrical member, and the displacement of the second cylindrical member relative to the first cylindrical member can be read by reading the scale of the scaling member. That is, the displacement can be read from the outside in a condition having the waterproof cover.

A fourth aspect of the invention is characterized in that the cylindrical members are arranged in a condition which is inclined from a horizontal direction, the waterproof cover is placed at an edge located at an upper side of the cylindrical member in an inclined condition, a discharging means for discharging rainwater entered into the gap is arranged at an edge located at a lower side of the cylindrical member in an inclined condition, and a collecting means for collecting fluid is connected to this discharge means, in the invention according to any one of the first, second and third aspects.

According to the fourth aspect of the invention, the upper (upstream) edge of the gap between the cylindrical members arranged in an inclined condition, into which rainwater easily enters, is covered by the waterproof cover. As a result, rainwater can be effectively prevented from entering into the gap between the cylindrical members. In addition, rainwater that has flowed along the inclination and the oil component of the grease flushed out by rainwater can be discharged to the outside without scattering, since the discharging means for discharging fluid and the collecting means for collecting the fluid are arranged at a lower side (downstream) in this gap. That is, by combining a waterproof function with a function for positively collecting and discharging fluid from the inside without scattering, rainwater can be prevented from entering into the inside, and the rainwater can be collected and discharged to the outside without scattering, even if it enters into the inside. Therefore, inconvenience (corrosion, etc.) due to entry of the rainwater into the gap can be prevented, and moreover, inconvenience (pollution of the environment, etc.) due to dispersion of oil can also be prevented.

A fifth aspect of the invention is a waterproof cover for an overhead wire tension balancer which attaches to the overhead wire tension balancer comprising cylindrical members arranged coaxially, a coil spring applying elastic force against relative extension of the cylindrical members in an axial direction, and a lubricating agent coated on the coil spring, which comprises a cover portion which covers at least a part of a gap between the cylindrical members and an attaching means for attaching the waterproof cover to one of the cylindrical members. According to the invention of the fifth aspect, a waterproof cover having a function that prevents rainwater from entering into a gap between the cylindrical members, can be provided.

In the present invention described above, the overhead wire is not limited to an overhead wire for a railroad, and it can be kinds of electric power cable or electric signal cable that require being arranged and tensioned. In addition, the overhead wire can be a wire for supporting an electrical cable, a wire for carrying a load, or the like.

According to the present invention, in the overhead wire tension balancer, an oil component from the inner lubricating agent can be prevented from scattering to the outside by rainwater entering into the inside of the tension balancer.

BRIEF DESCRIPTION OF THE DRAWINGS

FIG. 9 is an enlarged side view (A) enlarging a part of FIG. 8 and a back view (B) viewed from the left direction.

EXPLANATION OF REFERENCE NUMERALS

100: Tension balancer for aerial cable, 101: Outer cylindrical structural body, 102: Middle cylindrical structural body, 103: Inner cylindrical structural body, 104: Coil spring, 105: Coil spring, 106: Overhead wire attaching member, 108: U bar, 200: Supporting pillar, 201: Attaching band, 202: Attaching member, 204: Supporting member, 206: Scaling pipe, 207: Collecting pipe, 211: Recovering tank, 500: Waterproof cover, 501: Covering member, 502: Reinforcing member, 503: Screw, 504: Edge surface plate, 505: Cushioning member, 506: Slit, 507: Bolt.

BEST MODE FOR CARRYING OUT THE INVENTION (1) First Embodiment

Structure of Tension Balancer for Aerial Cable

Figure 1:
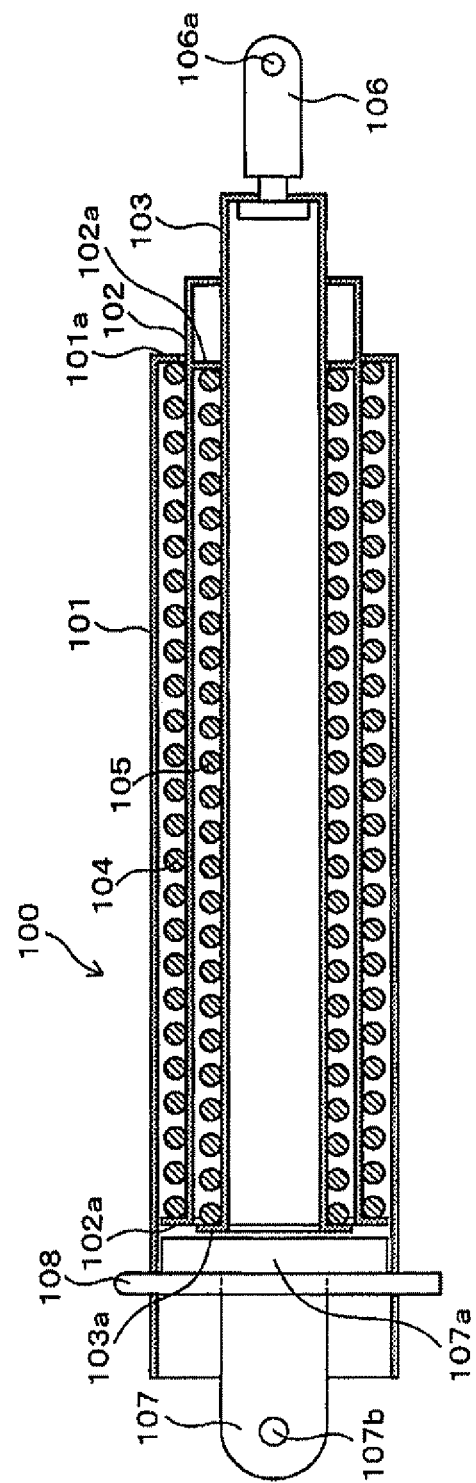
FIG. 1 is a cross sectional view showing the concept of an overhead wire tension balancer to which the present invention is applied.

First, one example of basic structure of overhead wire tension balancer to which the present invention is applied, is explained. FIG. 1 shows a cross sectional structure of the overhead wire tension balancer 100. The overhead wire tension balancer 100 has an outer cylindrical structural body 101, a middle cylindrical structural body and an inner cylindrical structural body 103, as a cylindrical structure body.

In a gap between the outer cylindrical structural body 101 and the middle cylindrical structural body 102, the coil spring 104 in a compressed condition is contained. In the situation shown in FIG. 1, the left edge of the coil spring 104 is contacted to the outer flange part 102a of the middle cylindrical structural body 102, and right edge of the coil spring 104 is contacted to the inner flange part 101a of the outer cylindrical structural body 101.

In a gap between the middle cylindrical structural body 102 and the inner cylindrical structural body 103, the coil spring 105 in a compressed condition is contained. In the situation shown in FIG. 1, the left edge of the coil spring 105 is contacted to the outer flange part 103a of the inner cylindrical structural body 103, and the right edge of the coil spring 105 is contacted to the inner flange part 102a of the middle cylindrical structural body 102. At the parts at which the coil springs 104 and 105 are contacted to the cylindrical structural body, a grease for lubrication is applied or filled in so as not to inhibit relative sliding thereof.

At the edge surface of the inner cylindrical structural body 103 in FIG. 1, the overhead wire attaching member 106 is fixed. The overhead wire attaching member 106 has a bolt hole 106a, and an overhead wire, not shown in the figure, is attached to the overhead wire attaching member 106 using this bolt hole 106a.

The overhead wire tension balancer 100 is supported on a supporting pillar, not shown in the figure, by a supporting member 107. More particularly, a flange part 107a of the supporting member 107 is pressed by a U bar 108, which is a fixing member, the supporting member 107 is maintained so as not to move in the left direction of the figure relative to the outer cylindrical structural body 101. It should be noted that the U bar 108 is to be attached to the outer cylindrical structural body 101 by being inserted into the attaching hole from upward in the figure, which is formed on the outer cylindrical structural body 101. A bolt hole 107b is formed on the supporting member 107. The overhead wire tension balancer 100 is attached to a supporting pillar, not shown in FIG. 1, via this bolt hole 107b.

In the overhead wire tension balancer 100, because of its function, the outer cylindrical structural body 101 and the middle cylindrical structural body 102 are made to be mutually slidable in the axial direction, and furthermore, the middle cylindrical structural body 102 and the inner cylindrical structural body 103 are made to be mutually slidable in the axial direction. As a result, slight gaps are formed between the cylindrical members. Therefore, the above-mentioned entry of rainwater into the gaps is difficult to avoid without employing a special waterproof structure. In the present invention, to prevent from entering rainwater into the gap, a waterproof cover is attached as described below.

Here, the overhead wire tension balancer 100 comprises a water drainage hole for discharging rainwater that has entered inside to the outside; however, it is not shown in FIG. 1.

(Function of Overhead Wire Tension Balancer)

FIG. 1 shows a condition in which tension is not applied from the overhead wire to the overhead wire tension balancer 100. In actual use, the supporting member 107 is attached to a supporting pillar, not shown in the figure, and furthermore, the overhead wire is attached to the overhead wire attaching member 106, and thus the overhead wire is built. During this process, by the weight of the overhead wire and by a force pulling the overhead wire in the rightward direction in the figure, the overhead wire attaching member 106 is pulled relatively to the right direction in the figure.

In this case, since the coil springs 104 and 105 are compressed, in order to pull the inner cylindrical structural body 103 out of middle cylindrical structural body 102, and further, to pull the middle cylindrical structural body 103 out of the outer cylindrical structural body 101, a force larger than the elastic force of the coil springs 104 and 105 is required. A reactive force of this force corresponds to a tensile force acting on the overhead wire attached to the overhead wire attaching member 106. In this way, the tensile force toward the left direction which pulls an overhead wire, not shown in the figure and hangs to the right direction in FIG. 1 would be generated. This applying of the tensile force to the overhead wire is a function of the overhead wire tension balancer.

(Arrangement Condition of Overhead Wire Tension Balancer)

Figure 2A:
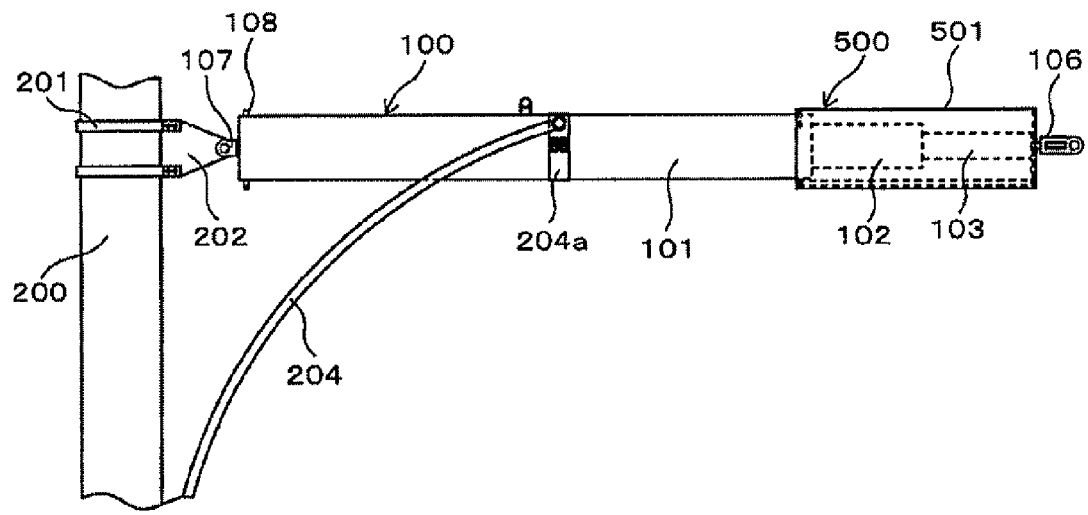
FIG. 2 is a side view showing a condition which attaches a waterproof cover to the overhead wire tension balancer.
Figure 2B:
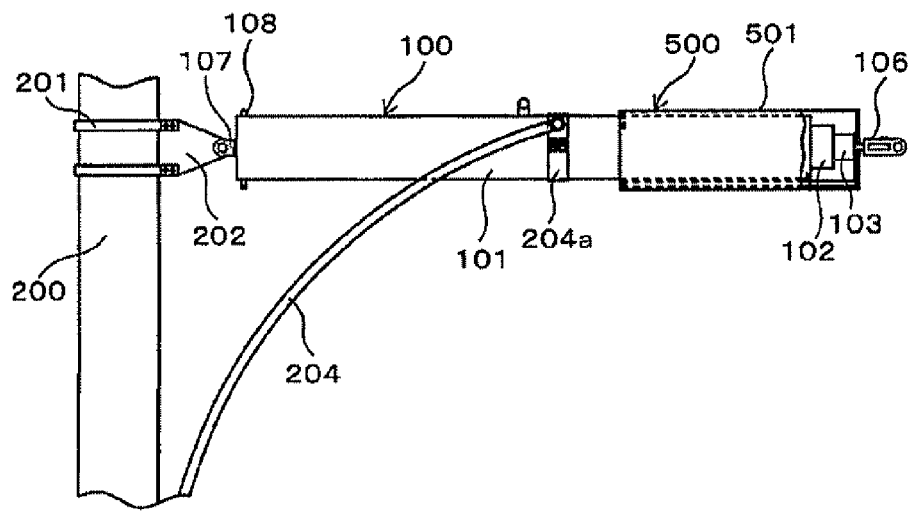

FIG. 2 is a side view showing a condition of using the overhead wire tension balancer 100 having a basic structure as shown in FIG. 1. FIG. 2 shows one example of a condition in which an overhead wire tension balancer, to which is attached a waterproof cover 500 to the overhead wire tension balancer 100, is attached to the supporting pillar 200. FIG. 2A shows a condition in which the overhead wire tension balancer 100 is the greatest extended by applying tension force, and FIG. 2B shows a condition in which the overhead wire tension balancer 100 is not extended at all.

One edge (left edge) of the overhead wire tension balancer is attached to the supporting pillar 200. That is, an attaching member 202 is fixed to the supporting pillar 200 by an attaching band 201, and the supporting member 107 is fixed to the attaching member 202 by bolts.

An attaching band 204a is fixed to a middle portion of the outer cylindrical structure body 101, and an upper end of a supporting member 204 in a bent rod shape is fixed to the attaching band 204a. A lower end of the supporting member is fixed to a lower portion of the supporting pillar 200, not shown, by an attaching band having a structure similar to that of the attaching band 201. A middle portion of the overhead wire tension balancer 100 is supported from below by this structure.

Although it is not obvious from FIG. 2, a situation shown in the figure is a slope inclining to the lower left, and the overhead wire tension balancer 100 is arranged in the condition of being inclined slightly (several degrees to the horizontal line) to lower left. Here, one edge of the overhead wire tension balancer may be supported at a building by fixing the supporting member 107 to a wall of the building, etc., which is not the supporting pillar 200.

(Waterproof Structure)

As shown in FIG. 2, the middle cylindrical structure body 102 is slidable relative to the outer cylindrical structure body 101, and the inner cylindrical structure body 103 is slidable relative to the middle cylindrical structure body 102. Therefore, slight gaps are provided between the middle cylindrical structure body 102 and the outer cylindrical structure body 101, and furthermore, between the inner cylindrical structure body 103 and the middle cylindrical structure body 102. The cylindrical waterproof cover 500 is attached so as to cover an opening portion of the gap.

Figure 3A:
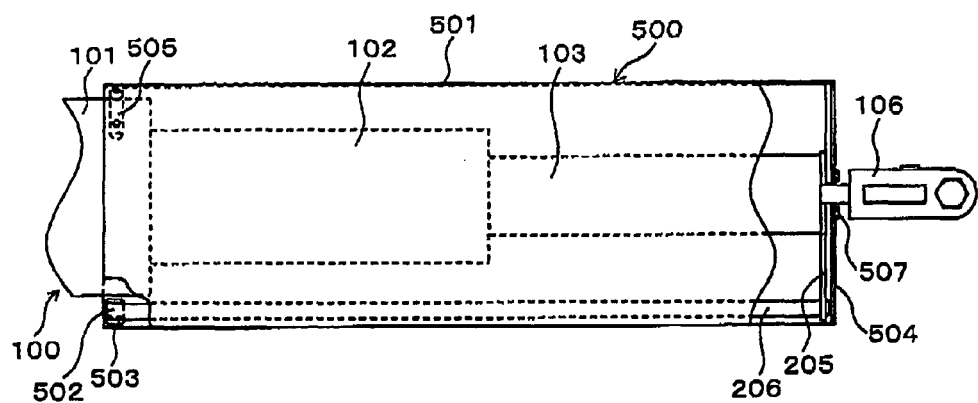
FIG. 3 is an enlarged side view (A) enlarging a part of FIG. 2 and a front view (B) viewed from the right direction.

FIG. 3 is a side view (A) enlarging a part of construction shown in FIG. 2, and a front view (B) of which construction of (A) is viewed from the right direction. It should be noted that FIG. 3 shows a situation in which the overhead wire tension balancer 100 is extended maximally and that description of an overhead wire will be omitted.

In an embodiment shown in FIG. 3, the waterproof cover 500 is attached in order to prevent from entering rainwater from the rightward direction in the figure into the gap between the above cylindrical structure bodies. The waterproof cover 500 has a covering member 501. The covering member 501 has a roof structure in which an upper part is bent in a semi-circular shape, and has a longitudinal shape extending to an axial direction of the overhead wire tension balancer 100. The length in an axial direction of the cover member 501 is a dimension in which part thereof overlaps an edge of the outer cylindrical structure body 101 in the case of the greatest extension shown in FIG. 2A. The lower part of the cover member 501 is an open structure, and a reinforcing member 502 in a strip plate shape is attached thereto by a screw 503, so as to cross part of the open structure.

At a side of the supporting pillar of upper and inside part of the covering member 501 (near left edge of the figure), a cushioning member 505 is attached. The cushioning member 505 is made of rubber or resin, and contacts to the upper surface of the outer cylindrical structural body 101 in a slidable condition.

Figure 3B:
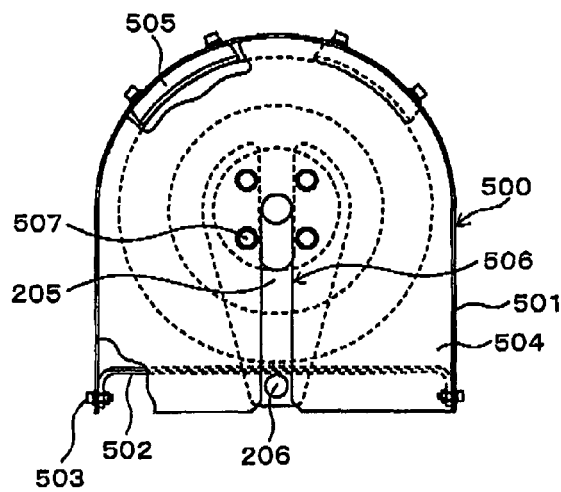

The overhead wire side (right side of the figure) of the covering member 501 is sealed with an edge surface plate 504 unified with the covering member 501, and the supporting pillar side (left side of the figure) is opened. A slit 506 extending in the up-down direction is formed on the edge surface plate 504, and the overhead wire attaching member 106 can be protruded therethrough to the outside. In FIG. 3B, description of the overhead wire attaching member 106 is omitted, and the cross section of the axis 106a of the overhead wire attaching member 106 is drawn. The waterproof property can be further improved by closing the slit 506.

(Method for Attaching)

One example of working steps for attaching the waterproof cover 500 shown in FIGS. 2 and 3 to the overhead wire tension balancer 100 is explained as follows. Here, in a situation in which the overhead wire tension balancer 100 is actually used (situation of supporting overhead wire), a case of attaching the waterproof cover 500 is explained.

First, a supporting member 205 and a scaling pipe 206 are detached from the overhead wire tension balancer 100. Then a draining hole, not shown in figures, is closed by filling with a caulking agent. Next, the covering member 501 from which the reinforcing member 502 is detached is covered over the outer cylindrical structure body 101 from the upward direction, and the cushioning member 505 is contacted with the upper surface of the outer cylindrical structural body 101. At this time, the slit 506 is aligned with the axis 106a of the overhead wire tension balancer 106, and the position is adjusted so that the axis 106a protrudes to the rightward direction in the figure through the slit 506.

Next, a gap is formed between the edge surface plate 504 and the inner cylindrical structural body 103, the supporting member 205 unified with the scaling pipe 206 is inserted from below into the gap, and the position is adjusted. In this time, the position of the edge surface plate 504 is adjusted at the same time, and the supporting member 205 together with the edge surface plate 504 are fixed to the edge surface of the inner cylindrical structural body 103 by tightening with the bolt. Since the edge surface plate 504 has a structure unified with the covering member 501, the covering member 501 is fixed with the right edge of the inner cylindrical structure body 103 by the above fixation.

Next, the reinforcing member 502 is inserted into the gap between the scaling pipe 206 and the lower part of the outer cylindrical structural body 101 from a left direction of figure, and they are aligned. The reinforcing member 502 is fixed to the inside of the covering member 501 by the screw 503. Thus the condition shown in FIG. 3 is accomplished.

(Superiority)

According to the construction shown in FIGS. 2 and 3, a structure in which it is difficult for rainwater to enter into the inside of the overhead wire tension balancer 100 from the right side of the figure, is formed by the waterproof cover 500. In addition, as shown in FIG. 3, one edge (a right edge in the figure) of the waterproof cover 500 is fixed to a top portion of the middle cylindrical structure body 103 by the bolt 507, and an inner surface of the other edge is slidably arranged on the outer cylindrical structure body 101 via the cushioning member 505. According to the attached structure of the waterproof cover 500, the waterproof cover 500 is slidably supported from below by the outer cylindrical structure body 101. This supported structure is held, even if the waterproof cover 500 is slid relative to the outer cylindrical structure body 101. Therefore, the attached structure of the waterproof cover is a movable simple attached structure, and moreover, it is firm and stable.

In addition, because the length in an axial direction of the cover member 501 is a dimension in which part thereof overlaps at an edge of the outer cylindrical structure body 101 in the case of the greatest extension shown in FIG. 2A, the gap between the outer cylindrical structure body 101 and the middle cylindrical structure body 102 is covered by the waterproof cover 500, even if the length is the greatest extension. Therefore, in spite of an extension condition of the inner cylindrical structure body 103, the gap between the outer cylindrical structure body 101 and the middle cylindrical structure body 102, and in addition, the gap between the middle cylindrical structure body 102 and the inner cylindrical structure body 103 are covered by the waterproof cover 500, and the waterproof function is maintained.

This structure can be realized by attaching the waterproof cover 500 and other members accompanying it to a conventional overhead wire tension balancer with no waterproof cover. As described above, this process can be carried out by small steps without changing the conventional composition. Therefore, it can be realized at low cost.

In addition, the scaling pipe 206 can be seen from below in a condition in which the waterproof cover 500 is attached. Thus, the pulled length (displaced length) of the overhead wire attaching member 106 in a condition of use, can be confirmed.

(2) Second Embodiment

Structure

Figure 4:
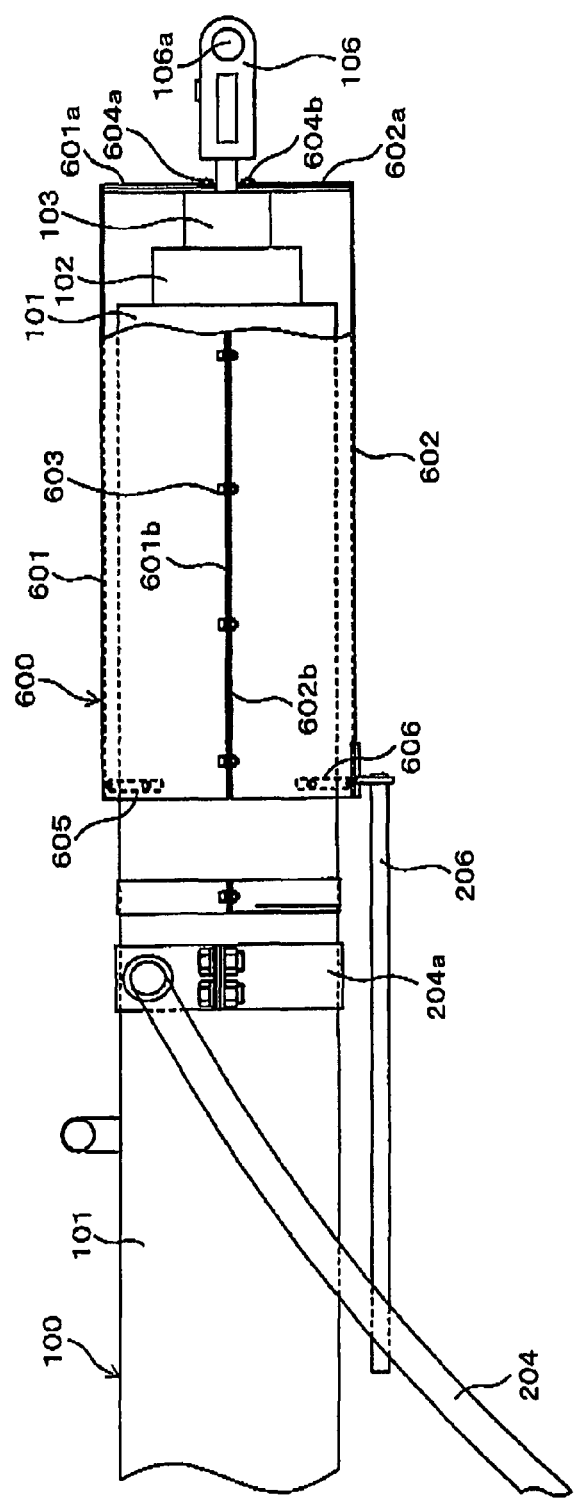
FIG. 4 is a side view showing another embodiment of the present invention.

FIG. 4 is a side view showing an example of another embodiment. In FIG. 4, the overhead wire tension balancer 100 in FIG. 1 is shown. A waterproof cover 600 is attached to the overhead wire tension balancer 100 shown in FIG. 4. The waterproof cover 600 has a structure which can divide into an upper part and a lower part in an axial direction.

That is, the waterproof cover 600 is divided into an upper cover 601 and a lower cover 602. The upper cover 601 and the lower cover 602 have symmetrical shapes in the up-down direction, respectively. When the upper cover 601 is explained, the upper cover 601 has a structure which divides a cylinder into two parts in an axial direction, and one edge (right edge of the figure) in an axial direction is closed by an edge surface member 601a which forms a semicircular hole in which a shaft 106a is received at the center, and the other edge (left edge of the figure) in an axial direction has an opening structure. A structure of the lower cover 602 is basically similar to this structure, only it is inverted. Here, the scaling pipe 206 is attached on the lower surface of the lower cover 602 near the left edge in the figure.

The edge surface member 601a of the upper cover 601 is fixed to a right edge surface in the figure of the inner cylindrical structure body 103 by the bolt 604a. In addition, a cushioning member 605 is fixed on the inner surface of the upper cover 601 near the right edge surface in the figure, and the cushioning member 605 is slidably contacted with the upper part of the outer circumference of the outer cylindrical structure body 101.

The edge surface member 602a of the lower cover 602 is fixed to a right edge surface in the figure of the inner cylindrical structure body 103 by the bolt 604b. A cushioning member 606 is fixed on the inner surface of the lower cover 602 near the right edge surface in the figure, and the cushioning member 606 is contacted with the lower part of the outer circumference of the outer cylindrical structure body 101.

The upper cover 601 and the lower cover 602 have a flange 601b and a flange 602b which extend in an axial direction, respectively, and the upper cover 601 and the lower cover 602 are united by contacting and combining these flanges both using bolts 603.

In this structure, the waterproof cover 600 is united with the inner cylindrical structure body 103, and is displaced in an axial direction relative to the outer cylindrical structure body 101. In this case, the cushioning members 605 and 606 are slid relative to the outer cylindrical structure body 101. Additionally, this displacement value can be read from a scale on the scaling pipe 206 attached to the waterproof cover 600.

Here, in the composition shown in FIG. 4, the overhead wire tension balancer 100 is fixed to the supporting pillar by a similar structure to the structure shown in FIG. 2. Explanation of the attached structure to this supporting pillar is omitted, since it is similar to that of the structure shown in FIG. 2.

(Method for Attaching)

Next, one example of a procedure for attaching the waterproof cover 600 shown in FIG. 4 to the overhead wire tension balancer 100 will be explained. First, in FIG. 4, a condition in which the waterproof cover 600 is not attached to the overhead wire tension balancer 100 is considered. In this condition, the upper cover 601 and the lower cover 602 in a divided condition are prepared. In this case, the scaling pipe 206 is attached to the lower cover 602.

Next, the upper cover 601 and the lower cover 602 are contacted from upward and downward with the outer cylindrical structure body 101, respectively, and bolts 604a, 604b and 603 are tightened after positioning. In this way, a condition shown in FIG. 4 is obtained. Here, in the case in which the hole for draining is provided on the overhead wire tension balancer 100, it may be sealed by a caulking agent.

(3) Third Embodiment

Figure 5:
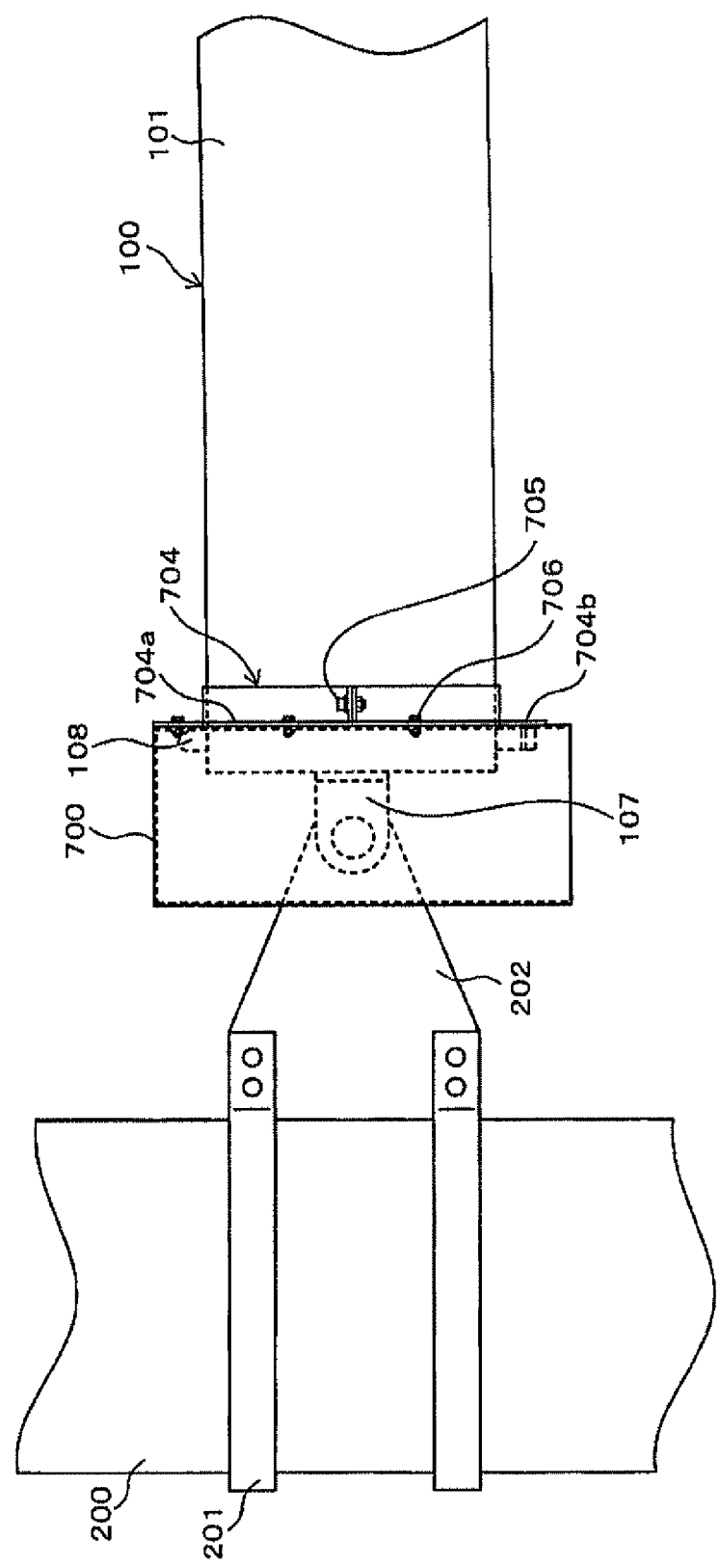
FIG. 5 is a side view showing another embodiment of the present invention.

The attachment of the waterproof cover is not limited to an overhead wire side of the overhead wire tension balancer, and it may be an attaching side to a supporting pillar, etc., of the overhead wire tension balancer. This embodiment will be explained as follows. FIG. 5 is a side view of the embodiment, and FIG. 6 is a back view of a part of FIG. 5 viewed from the left direction in the figure.

FIG. 5 shows the overhead wire tension balancer 100. One edge of the overhead wire tension balancer 100 is fixed to the supporting pillar 200 by the structure explained using FIG. 2. In this embodiment, an attaching portion to the supporting pillar is covered by a waterproof cover 700, and a waterproof structure is formed.

Figure 6:
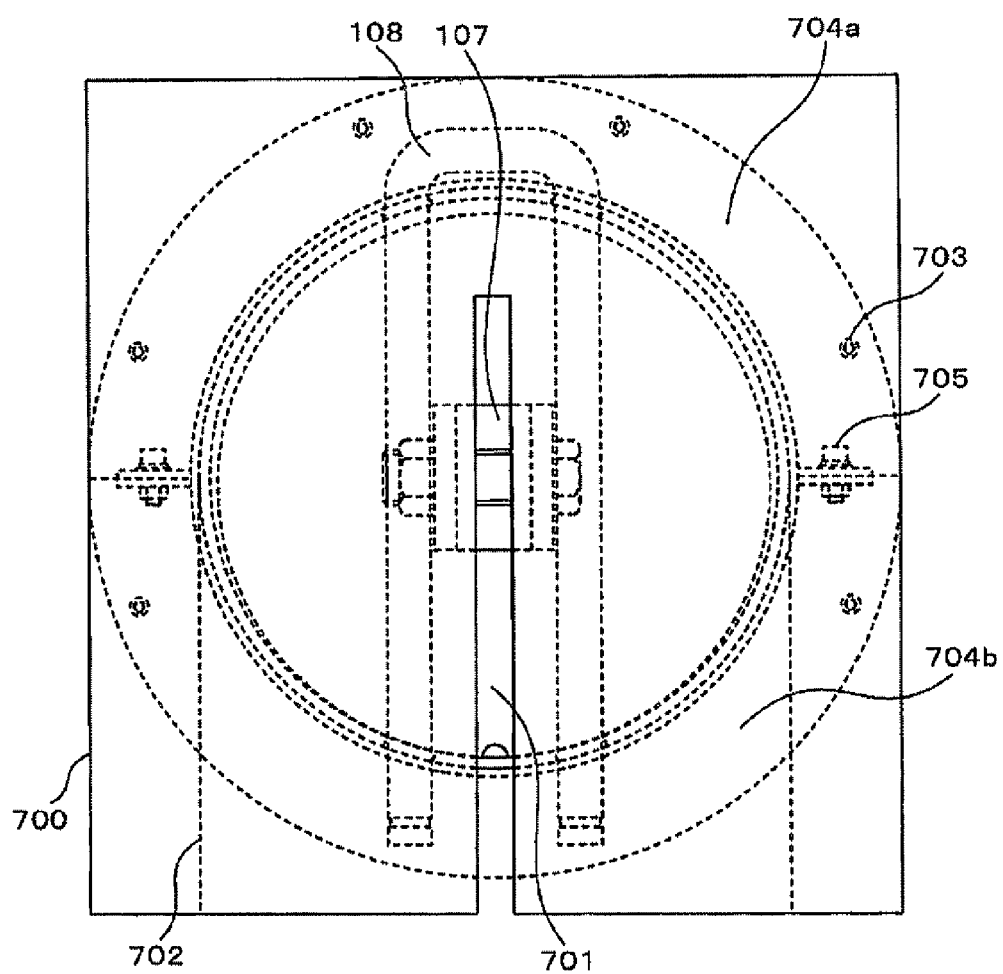
FIG. 6 is a back view of a part of FIG. 5 viewed from the left direction.
Figure 7A:
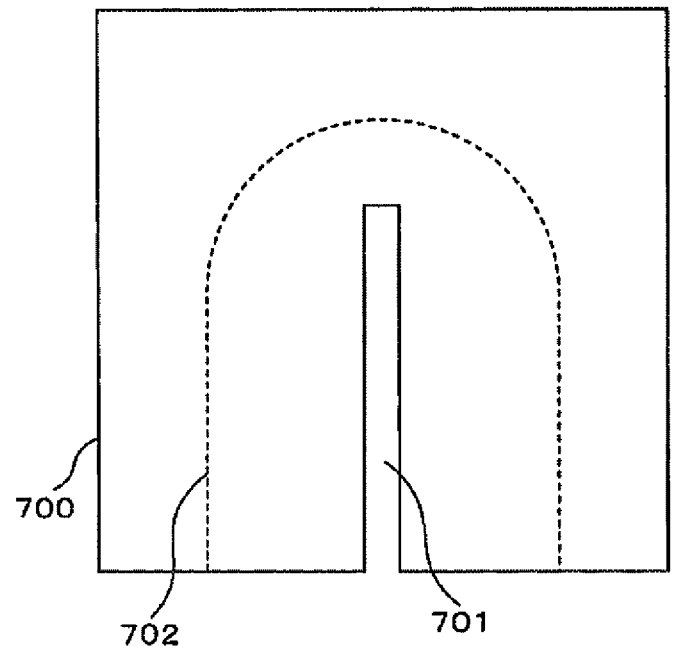
FIG. 7 is a back view (A) and a front view (B) of the waterproof cover of the present invention.

FIG. 6 is a back view of the waterproof cover 700 in an attached condition. FIG. 6 shows a condition in which a part of the waterproof cover 700 in FIG. 5 is viewed from a supporting pillar 200 side. Here, in FIG. 6, description of the attaching member 202 is omitted. FIG. 7 is a back view (A) and a front view (B) showing conditions in which the waterproof cover 700 is detached from the attached condition. Here, a back side means a side as viewed from a supporting pillar side in attaching, and a front side means a side as viewed from an overhead wire side in attaching.

Figure 7B:
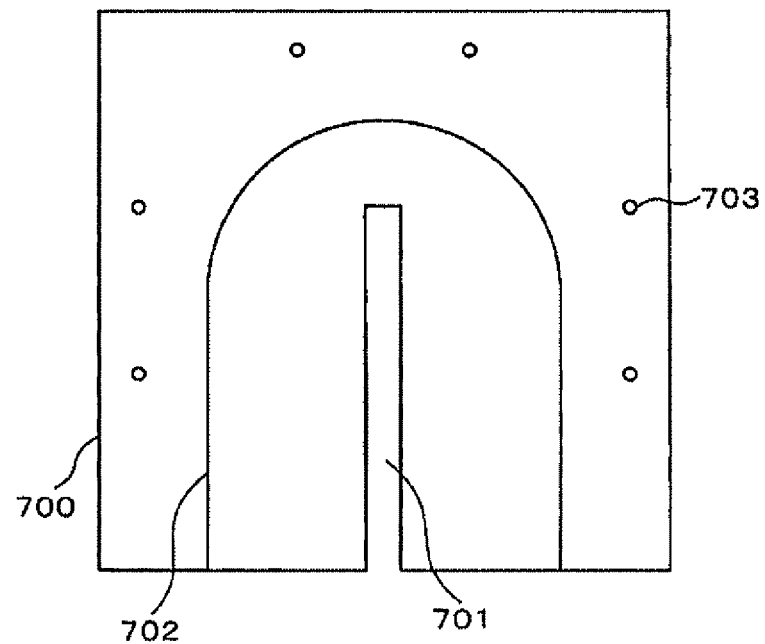

At the back side of the waterproof cover 700, a slit 701 for inserting the attaching member 202 is formed. The slit 701 extends from a lower edge to the upward direction. At the front side of the waterproof cover 700, an opening 702 for avoiding interference with the overhead wire tension balancer 100 is formed. The opening 702 has a shape in which an upper side is a semicircle and both sides extend to a lower edge. Furthermore, at the front side of the waterproof cover 700, bolt holes 703 for attaching to the overhead wire tension balancer 100 are formed, as shown in FIG. 7B.

The waterproof cover 700 is attached to the overhead wire tension balancer 100 via an attaching band 704, as shown in FIG. 5. Specifically, first, the attaching band 704 is attached near a supporting pillar side of the outer cylindrical structure body 101. The attaching band 704 can be divided into two parts in the up-down direction and the parts have flanges 704a and 704b, respectively. The divided attaching bands 704 are connected by bolts 705, and are attached so as to sandwich the outer cylindrical structure body 101 from the upward and the downward directions.

Then, the waterproof cover 700 is fixed at the above flanges 704a and 704b by bolts 706. In this case, the bolt holes 703 shown in FIGS. 6 and 7 are used. In this way, the waterproof structure shown in FIG. 5 is formed. Here, FIG. 6 shows a positional relationship in a condition in which the waterproof cover 700 is attached to the flanges 704a and 704b.

Although the waterproof structure at an overhead wire side is not described in FIG. 5, the waterproof covers shown in FIGS. 2 and 4 may be attached to a connecting edge of the overhead wire. The attachment of the waterproof cover to the overhead wire side may be chosen depending on an arrangement condition of the overhead wire tension balancer.

(Method for Attaching)

Next, one example of a procedure for obtaining the structure shown in FIG. 5 will be explained. First, in FIG. 6, a condition in which the waterproof cover 700 is not attached to the overhead wire tension balancer 100 is considered. In this condition, the attaching bands 704 are attached to the outer cylindrical structure body 101. Then, the waterproof cover 700 is attached from the upward direction at the positional relationship shown in FIG. 5, and bolts 706 are tightened after positioning. Therefore, the waterproof cover 700 is fixed to the flanges 704a and 704b of the attaching bands 704, and a condition in which the waterproof cover 700 shown in FIG. 5 is attached can be obtained.

(4) Fourth Embodiment

Figure 8:
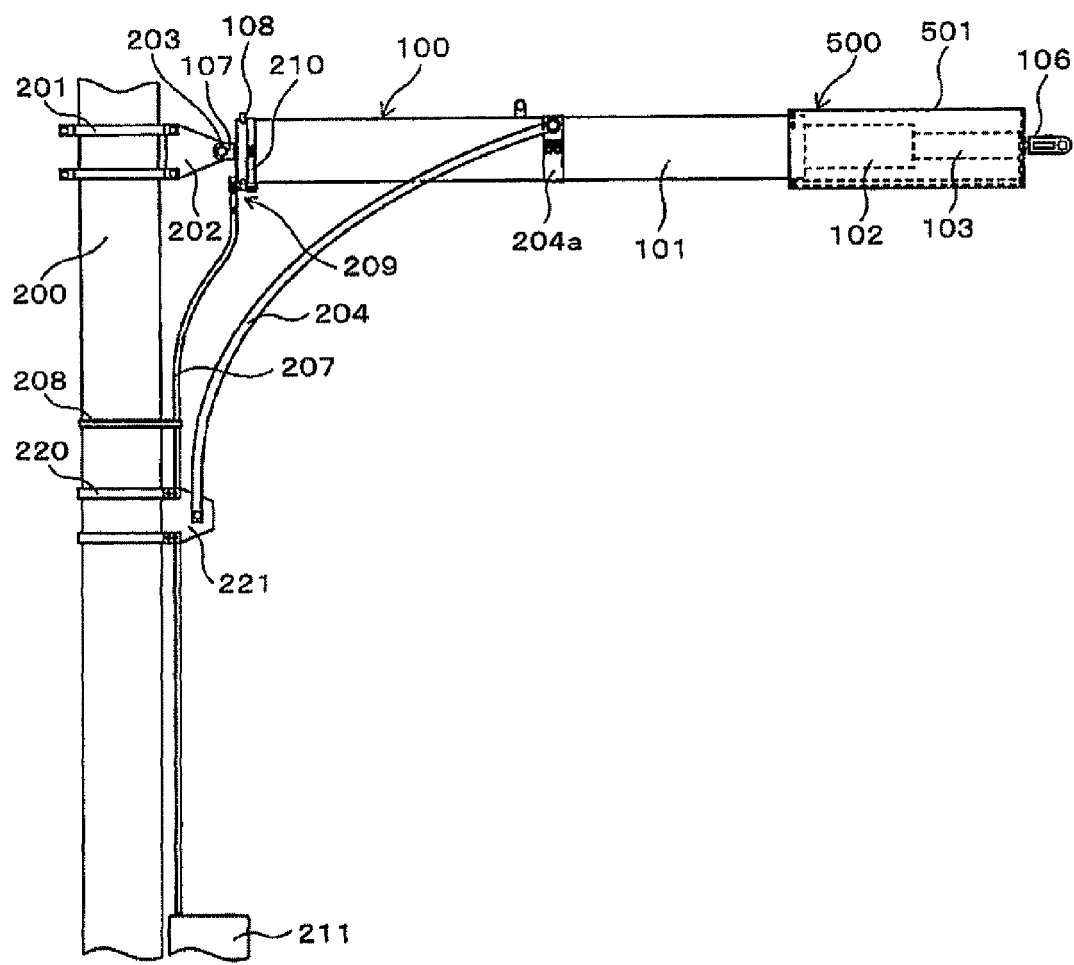
FIG. 8 is a side view showing another embodiment of the present invention.

In the structure shown in FIG. 2, a structure for collecting and discharging rainwater or an oil component from the inside of the overhead wire tension balancer 100 may be provided in addition to attachment of the waterproof cover 500. FIG. 8 is a side view showing another embodiment. FIG. 8 shows a structure in which a collecting pipe 207 is arranged as an example of a fluid collecting means in addition to the structure shown in FIG. 2. Here, the overhead wire tension balancer 100 is provided in a condition being inclined to the lower left in the figure in the same manner as the case shown in FIG. 2.

(Structure)

In the embodiment shown in FIG. 8, the overhead wire tension balancer 100 shown in FIG. 1 has an opening (cut part 110 shown in FIG. 9, as described below), which discharges rainwater that has entered into the inside or an oil component of fluidized grease from the left edge in the figure to the outside, on the lower part of the flange 107a. In this structure, a collecting pipe 207 is attached at a tail portion of the overhead wire tension balancer 100.

FIG. 9 is a side view (A) enlarging an attaching member 209 and a back view (B) viewed from the left direction of the figure. Attaching bands 210 are attached at the outer circumference of the outer cylindrical structure body 101, as shown in FIG. 9. The attaching bands 210 are tightened by bolts at tightening portions 210a and 210b and are fixed to the outer cylindrical structure body 101. An adjuster 212 is arranged at a lower part of the attaching bands 210, and a supporting plate 214 is fixed to the adjuster 212 by bolts 213. A cylindrical adapter 215 is fixed to the supporting plate 214 by nuts 21 and 22. The collecting pipe 207 is connected to the lower edge of the adapter 215, and a drain tube 216 having an L-shaped pipe structure is connected to the upper edge of the adapter 215. It should be noted that the reference numeral 217 indicates a connector for connecting the adapter 215 with the collecting pipe 207.

The right edge of the drain tube 216 has a shape which is fitted to the semicircle cut part 110 which is a hole for discharging formed on the flange 107a, and is contacted to it. According to this structure, rainwater and an oil component drained out of the cut part 110 would flow in the draining tube 216 to the left direction in the figure, then flow downward, and reach the collecting pipe 207 via the adaptor 215.

In FIG. 8, the collecting pipe 207, which extends downward along the supporting pillar 200, is fixed to the supporting pillar 200 by the attaching band 208, and the lower edge thereof is connected with a recovering tank 211. The recovering tank 211 is arranged near the root of the supporting pillar 200 or at a suitable position. Additionally, FIG. 8 shows a fixing member 221 for fixing a supporting member 204 to the supporting pillar 200 and an attaching band 220 for fixing the fixing member 221 to the supporting pillar 200. Here, explanation of the structure of the waterproof cover 500 in FIG. 8 is omitted, since it is similar to that of the structure shown in FIGS. 2 and 3.

(Superiority)

According to this embodiment, the waterproof cover 500 is attached to the upper side in an inclined condition in which rainwater easily enters. Therefore, the waterproof function is effectively demonstrated. Furthermore, since the collecting pipe 207 is connected with the lower side in an inclined condition (downstream in which the fluid flows), in the case in which rainwater enters into the overhead wire tension balancer, the rainwater that has entered into the inside can be efficiently collected and can be discharged to the outside without scattering. In addition, in the case in which an oil component having a high fluidity is separated from the grease, the oil component can be collected in the recovery tank 211 without scattering to the outside, using the collecting pipe 204. Additionally, the structure, enlarged and shown in FIG. 9, can be attached later to a conventional overhead wire tension balancer, which is already installed. Therefore, a conventional facility can be improved at a low cost.

(Variations)

In the case in which the overhead wire tension balancer 100 is arranged in a condition in which the lower right of the figure is inclined, the waterproof cover shown in FIG. 6 is fixed to the edge part of the supporting pillar 200, the water draining hole is provided at the overhead wire side, and the collecting pipe is connected thereto. As a result, rainwater can be prevented from entering into the overhead wire tension balancer 100, and moreover, rainwater can be discharged from the collecting pipe without scattering, even if the rainwater has entered thereinto.

The present invention can be used for an overhead wire tension balancer which gives tensile force to an overhead wire for a railroad or the like and supports it.

What is claimed is:

1. An overhead wire tension balancer comprising:
   cylindrical members arranged coaxially,
   a coil spring applying elastic force against relative extension of the cylindrical members in an axial direction,
   a lubricating agent coated on the coil spring, and
   a waterproof cover that covers at least part of a gap between the cylindrical members,
   wherein the cylindrical members include a first cylindrical member and a second cylindrical member, the first cylindrical member is located the furthest to the outside and is fixed to a supporting pillar or a building, the second cylindrical member is located the furthest to the inside and fixes the overhead wire, the waterproof cover has an open structure at a lower part along a longitudinal length of the waterproof cover thereof, and the waterproof cover is fixed to the second cylindrical member and is slidably contacted with the outer circumference of the first cylindrical member.

2. An overhead wire tension balancer according to claim 1, wherein the waterproof cover comprises a scaling member having a scale which measures a displaced dimension of relative extension in an axial direction between the cylindrical members.

3. An overhead wire tension balancer comprising:
   cylindrical members arranged coaxially,
   a coil spring applying elastic force against relative extension of the cylindrical members in an axial direction,
   a lubricating agent coated on the coil spring, and
   a waterproof cover that covers at least part of a gap between the cylindrical members,
   wherein the cylindrical members include a first cylindrical member and a second cylindrical member, the first cylindrical member is located the furthest to the outside and is fixed to a supporting pillar or a building, the second cylindrical member is located the furthest to the inside and fixes the overhead wire, the waterproof cover has an open structure at a lower part thereof, and the waterproof cover is fixed to the second cylindrical member and is slidably contacted with the outer circumference of the first cylindrical member,
   the cylindrical members are arranged in a condition which is inclined from a horizontal direction,
   the waterproof cover is placed at an edge located at an upper side of the cylindrical member in an inclined condition,
   a discharging means for discharging rainwater entered into the gap is arranged at an edge located at a lower side of the cylindrical member in an inclined condition, and
   a collecting means for collecting fluid is connected to the discharging means.

\* \* \* \* \*